No. 615,026. Patented Nov. 29, 1898.
D. F. HULBERT.
EMBOSSING PHOTOGRAPHS.
(Application filed Jan. 21, 1898.)
(No Model.) 3 Sheets—Sheet 1.
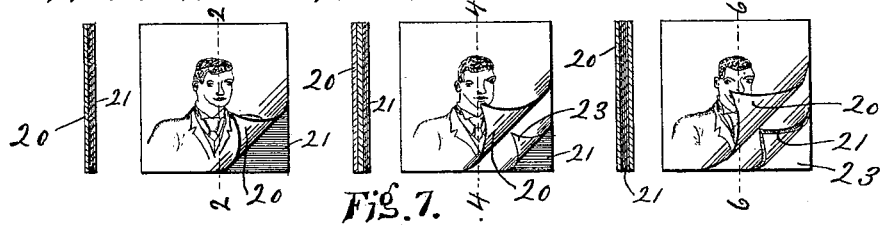
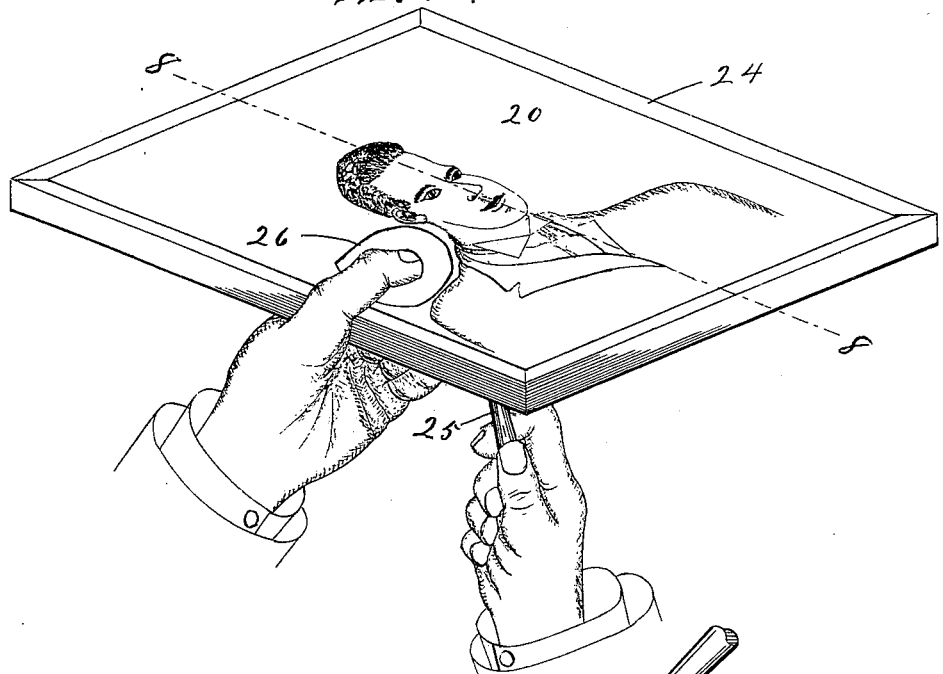
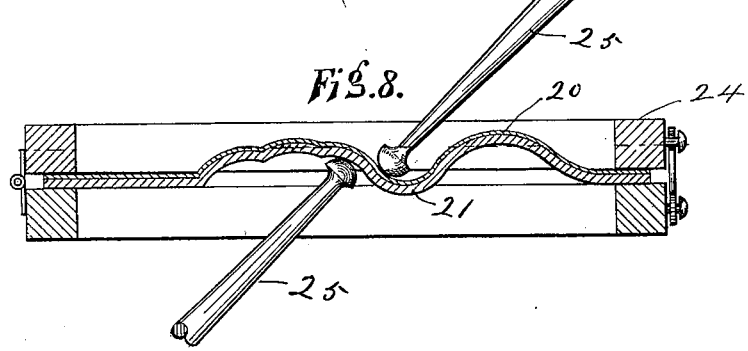
Witnesses.
J B Legg
J. M. Maupin
Inventor.
Duran F. Hulbert,
By Semer G. Wells,
Atty.

No. 615,026. Patented Nov. 29, 1898.
D. F. HULBERT.
EMBOSSING PHOTOGRAPHS.
(Application filed Jan. 21, 1898.)
(No Model.) 3 Sheets—Sheet 2.
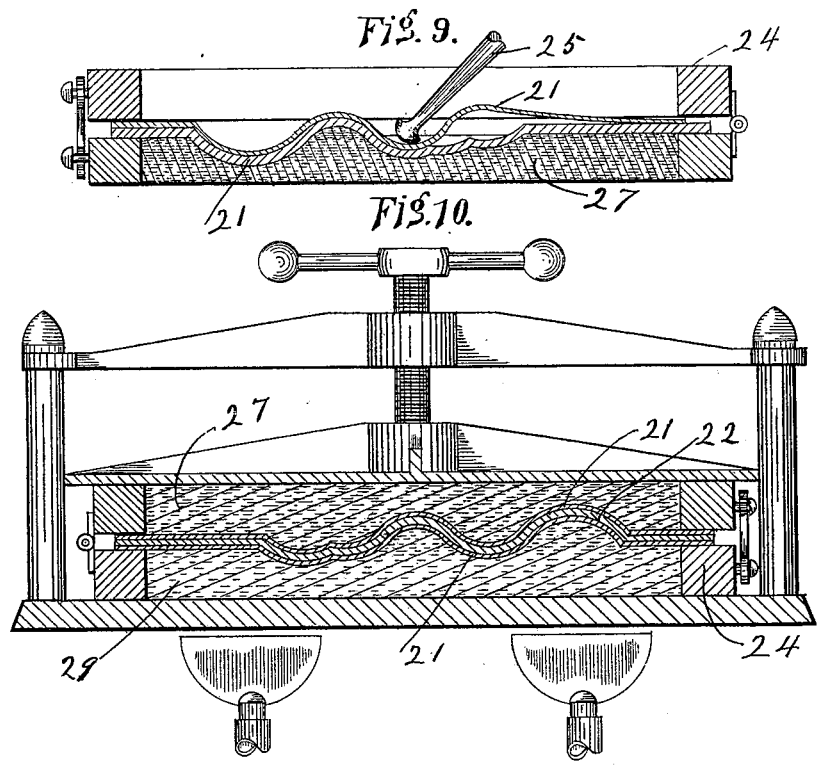
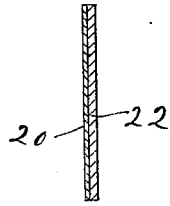
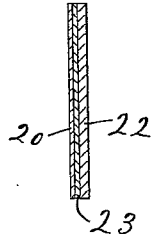
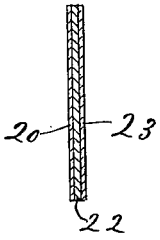
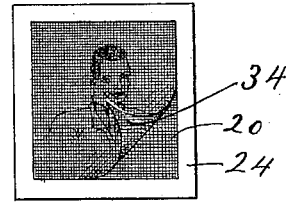

No. 615,026. Patented Nov. 29, 1898.
D. F. HULBERT.
EMBOSSING PHOTOGRAPHS.
(Application filed Jan. 21, 1898.)
(No Model.) 3 Sheets—Sheet 3.
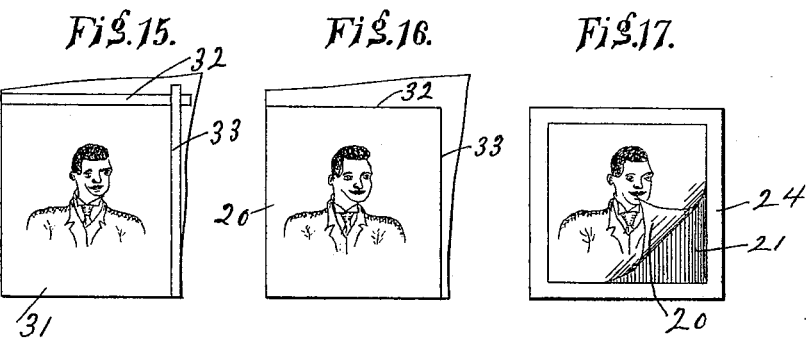
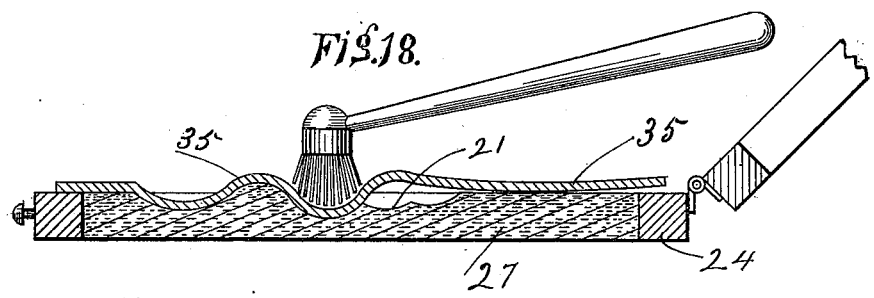
Witnesses.
J B Legg
J. M. Maupin
Inventor
Duran F. Hulbert,
By Semer G. Wells,
Atty

UNITED STATES PATENT OFFICE.

DURAN F. HULBERT, OF ST. LOUIS, MISSOURI.

EMBOSSING PHOTOGRAPHS.

SPECIFICATION forming part of Letters Patent No. 615,026, dated November 29, 1898.

Application filed January 21, 1898. Serial No. 667,464. (No specimens.)

*To all whom it may concern:*

Be it known that I, DURAN F. HULBERT, a citizen of the United States, residing at St. Louis, in the State of Missouri, have invented an Improvement in the Art of Embossing, of which the following is a specification.

My invention relates to improvements in the art of embossing; and it consists of the novel methods and features herein shown, described, and claimed.

Figure 1 is a plan showing a print upon a mount ready to be embossed. Fig. 2 is a cross-section on the line 2 2 of Fig. 1. Fig. 3 is a plan analogous to Fig. 1 and showing a reinforcing-sheet between the mount and print. Fig. 4 is a cross-section on the line 4 4 of Fig. 3. Fig. 5 is a view analogous to Fig. 3, with the reinforcing-strip on the opposite side of the mount from the print. Fig. 6 is a cross-section on the line 6 6 of Fig. 5. Fig. 7 is a perspective of the print, together with the mount, mounted in a frame and illustrating the method of embossing. Fig. 8 is a cross-section on the line 8 8 of Fig. 7. Fig. 9 is a view analogous to Fig. 8, showing the parts turned bottom upward and in use as a die. Fig. 10 is a view analogous to Fig. 9 and showing another step in the art—to wit, a pair of dies with a print and mount between them. Fig. 11 is an enlarged cross-section through the print and mount shown in Fig. 10 and showing the print applied to the mount. Fig. 12 is analogous to Fig. 11 and shows a reinforcing-sheet between the print and mount. Fig. 13 is analogous to Fig. 11 and shows a reinforcing-sheet applied to the opposite side of the mount from the print. Fig. 14 illustrates the method of graining the print. Fig. 15 is a plan of a scored negative. Fig. 16 is a plan of a scored print. Fig. 17 is a plan of the die and shows how the print registers. Fig. 18 is a view analogous to Fig. 9 and showing the process of making a matrix from the die. Fig. 19 is a cross-section of a die made from the matrix shown in Fig. 18.

My object is to expedite and cheapen the work of turning out bas-relief or embossed photographs, pictures, prints, and the like, either in small or large quantities, and thereby increase the variety and range of embossed goods.

My invention is applicable to books, advertising matter, maps, chromos, colored or uncolored press-prints, hand-paintings, and all other kinds of embossed or bas-relief work, as well as to photographs or sun-prints.

Referring in detail to the drawings, 20 is the print, which may be a press-print, a hand-painting, a photographic print, or the like.

Embossed photographs should not be glossy or shiny, and such paper should be used as will avoid this objection. All ordinary sensitized photographic paper is made by the use of gelatin or collodion emulsions, which form a filmy glossy surface, making the embossed photograph shine as though it were greased, thereby destroying the beautiful effect sought. I avoid this objection by using paper having a rough uncalendered surface and sensitized with a solution of silver nitrate dissolved in water. If desired, a solution of platinum may be added to the silver nitrate. There is no film or gloss or shine to such paper so treated, and the desired effect is secured.

At one step in the art I prefer the mount 21, while at another step I prefer the mount 22, although they are interchangeable, or either may be employed to the exclusion of the other. The mount 21 is a plate of pliable non-elastic yielding permanently-configurable dry-bodied material, such as sheet-lead, an alloy of lead and tin, or the like. The mount 22 is a sheet or plate of material which is pliable, non-elastic, and yielding when wet and permanently configurable when dry, such as pulp-board, fiber-board, blotting-paper, porous cardboard, and the like. This material is improved for the purpose when sized with glue and the like.

While the mount 21 is preferable for hand-embossing, the mount 22 is preferable for machine-work.

When a very thin mount 21 is used or the print is large, or both, the reinforcing-sheet 23, of paper, thin cardboard, or the like, may be used to great advantage, and it may be placed either between the print and the mount, as in Figs. 3 and 4, or it may be placed upon the opposite side of the mount from the print, as in Figs. 5 and 6. The reinforcing-sheet may be employed in the same way in connection with the mount 22, as shown in Figs. 12 and 13.

If the print 20 is pasted upon the mount 21, as in Fig. 1, it may be embossed before it is thoroughly dry or it may be wet upon the parts to be elevated or depressed. When the reinforcing-sheet 23 is used between the print and the mount, as in Figs. 3 and 4, it adds greatly to the stiffness and the parts to be elevated or depressed should be wet from the face of the print. When the reinforcing-sheet is used upon the opposite side of the mount from the print, the parts of the print to be elevated or depressed should be wet and the corresponding parts of the reinforcing-strip should be wet. When the print is pasted upon the mount 22, the parts of the print to be elevated or depressed should be wet from its front face and the corresponding parts of the mount should be wet from its rear face. In either case the parts become rigid and permanently configured when dry. After the print has been mounted and prepared for embossing as described it is placed in an open frame 24, as shown in Figs. 7 and 8, parts of the mount are pressed against the print, thus forming elevations, and parts of the print are pressed backwardly, thus forming depressions. An embossing or burnishing tool 25 or any similar instrument may be used in this work. While the tool 25 is working against the back side of the mount, a guide 26, which may be of irregular outline, like irregular curves used by draftsmen, may be held by the opposite hand against the front face, and vice versa, thus making the embossed parts sharp in outline by holding back the surrounding parts. After the embossing is completed the picture may be removed from the frame and the operation repeated, thus forming substantial duplicates.

If several exact duplicates are desired, they may be formed as illustrated in Fig. 9. The space within the frame above the print is filled with a plastic material which will harden when cold or dry, thus forming a die 27. Then the frame is turned bottom upward, and the duplicate prints are placed one at a time in registering position against the back side of the mount (the face of the die) and pressed firmly into the indentations of the die by the use of a tool 25 or in any suitable way.

If a larger number of the duplicate pictures is desired, the steps illustrated in Figs. 10, 11, 12, and 13 are suitable. The prints to be duplicated are pasted to the mounts 22. The die 27 (shown in Fig. 9) is used, and a mating die 29 is formed by pressing a mount against the first die and filling the space above this mount with plastic material, as in forming the first die. The frame is then opened, and one of the prints to be duplicated is placed between the dies. The frame is then placed in a letter-press or other suitable press and pressure applied. Gas-jets or other suitable heat may be applied to heat the press and dies and expedite the drying of the prints. The prints may be left in the press any desired length of time until sufficiently dried.

It is important that some means be provided for causing the prints to register properly with the die. The means I employ are illustrated in Figs. 15, 16, and 17. I take the negative 31 and score it at one side and one end. The scoring may be done by making lines of any kind at right angles to each other. I prefer to make these lines by applying the strips of paper 32 and 33, one to the upper end and one to the right-hand side of the negative upon the lines where it is desired to trim the print, as shown in Fig. 15. The scores will appear upon the print in white, as shown in Fig. 16. The white is carefully trimmed away from the prints, thus producing two trued and uniform edges relative to the figures upon the prints. After the print has been mounted and embossed preparatory to forming a die the mount is trimmed to the trued edges of the print. Then the copies to be embossed are fed to the die with their trued edges registering with the trued edges of the die-mount, as shown in Fig. 17.

The finish or face of embossed work is especially important. As before suggested, a glossy or shiny appearance does not give a satisfactory effect. In Fig. 14 I have illustrated a method of overcoming this objection to some extent and a method which produces in many instances a very satisfactory result. After the prints are ready for the press I place a sheet 34 of suitable material against the face of the print, and after the print has been pressed and the sheet 34 is removed the print has the appearance of having been grained. The sheet 34 may be of fine bolting-cloth or any other desired fabric which will produce the desired grained effect. The graining of the print slightly roughens the surface and destroys to some extent the glossy or shiny appearance and at the same time makes the clothing and other apparel appear natural.

When it is desired to turn out a great number of the duplicate pictures at a considerable rate of speed, the steps illustrated in Figs. 18 and 19 may be employed. Take the die 27, (shown in Fig. 9,) open up the frame, make a matrix 35 of the face of the die, and cast a plate 36 from the matrix. This plate may be placed upon an embossing power-press, a mating matrix formed in the usual manner, and the prints fed to the press in the usual way.

It is my usual practice to score and trim the prints, paste one of the prints upon a lead mount, trim the mount, emboss the mount by hand, apply the plastic material, press a second metallic mount against the back of the first mount, apply the second mass of plastic material, paste the other copies upon the non-metallic mounts, warm up the press, wet the copies and mounts, place the graining-sheets against the faces of the prints, place the dies in the press, feed the copies to the trimmed die with the trimmed edges of the copies registering with the trimmed edges of the die, and allow the mounts to dry before removing from the press.

I claim—

1. The improvement in the art of embossing, which consists of applying the print to a plate of pliable, non-elastic, yielding, permanently-configurable, dry-bodied substance, such as specified, then wetting only those parts of the print that are to be elevated, then elevating parts of the plate, the parts elevated being sufficiently rigid to retain their positions and shape permanently under the varying conditions of climate, substantially as described.

2. The improvement in the art of embossing, which consists of applying the print to a plate of pliable, non-elastic, yielding, permanently-configurable, dry-bodied substance, such as specified, then wetting only those parts of the print that are to be elevated or depressed, then elevating or depressing parts of the plate, the parts elevated or depressed being sufficiently rigid to retain their positions and shape permanently under the varying conditions of climate, substantially as described.

3. The improvement in the art of embossing, which consists of applying a reinforcing-sheet to a plate of pliable, non-elastic, yielding, permanently-configurable, dry-bodied substance, such as specified, applying the print, then wetting only those parts of the print that are to be elevated or depressed, and then elevating or depressing parts of the plate, substantially as specified.

4. The improvement in the art of embossing, which consists of taking a plate of pliable, non-elastic, yielding, permanently-configurable, dry-bodied substance, such as specified, as a mount, applying a reinforcing-sheet to one side of the mount, applying the print to the opposite side of the mount, then wetting only those parts of the print which are to be elevated or depressed, and then elevating or depressing parts of the plate, substantially as specified.

5. The improvement in the art of embossing, which consists of taking a plate of pliable, non-elastic, yielding, permanently-configurable, dry-bodied substance, such as specified, as a mount, applying a reinforcing-sheet to one side of the mount, applying a print to the opposite side of the mount, then wetting both the print and reinforcing-sheet, and then elevating or depressing parts of the plate, substantially as specified.

6. The improvement in the art of embossing, which consists of taking a plate of pliable, non-elastic, yielding, permanently-configurable, dry-bodied substance, such as specified, as a mount, applying a reinforcing-sheet to one side of the mount, applying the print to the opposite side of the mount, securing the mount in a frame, then wetting only those parts of the print which are to be elevated or depressed, and then elevating or depressing parts of the plate, the parts elevated or depressed being held in position by the inherent strength of the material of the mount, substantially as specified.

7. The improvement in the art of embossing, which consists of taking a plate of pliable, non-elastic, yielding, permanently-configurable, dry-bodied substance, such as specified, as a mount, applying a reinforcing-sheet to one side of the mount, applying the print to the opposite side of the mount, then wetting only those parts of the print which are to be elevated or depressed, securing the mount in a suitable frame, and then elevating or depressing parts of the plate, substantially as specified.

8. The improvement in the art of embossing, which consists of applying the print to a plate of pliable, non-elastic, yielding, permanently-configurable, dry-bodied substance, then wetting only that portion of the print that is to be depressed or elevated, then depressing or elevating parts of the plate, as by a suitable tool, and applying a guide in opposition to the tool, substantially as specified.

9. The improvement in the art of embossing, which consists of applying the print to a non-elastic, dry-bodied mount, such as specified, capable of yielding or being made to yield under pressure, wetting the print only upon the parts to be elevated or depressed, then elevating or depressing parts of the plate, substantially as specified.

10. The improvement in the art of embossing, which consists of applying a print to a plate of pliable, non-elastic, yielding, permanently-configurable, dry-bodied substance, as a mount, securing this in a suitable frame, wetting the print only upon the parts to be elevated or depressed, then elevating or depressing parts of the plate, substantially as specified.

11. The improvement in the art of embossing, which consists of applying a print to a pliable, non-elastic, yielding, permanently-configurable mount, placing the mount in an open frame, wetting parts of the print, elevating or depressing parts of the mount, and filling the space within the frame above the print with a plastic material which will harden when cold or dry, thus forming a die, substantially as specified.

12. The improvement in the art of embossing, which consists of applying a print to a pliable, non-elastic, yielding, permanently-configurable mount, placing the mount in an open frame, elevating or depressing parts of the mount with a movable guide held upon one side while a tool is pressed against the opposite side, and filling the space within the frame above the print with a plastic material which will harden when cold or dry, inverting the whole and using it as a die, substantially as specified.

13. The improvement in the art of embossing, which consists of scoring the negative thereby causing the prints to be scored, trimming off the prints to the scored lines, mounting one print upon a plate of permanently-configurable material, trimming the mount of the trued edges of the print, embossing the plate by hand, applying plastic material to one side of the plate or print, making a stereotype-matrix of the die thus formed, certain edges of said matrix being trued or scored to correspond to the trued edges of the print, casting a stereotype-die from said stereotype-matrix, certain edges of said die being trued to correspond to the trued edges of the print, and feeding the remaining prints to said stereotype-die with their trued edges registering with the trued edges of said stereotype-die, substantially as specified.

DURAN F. HULBERT.

Witnesses:
J. B. LEGG,
J. M. MAUPIN.